United States Patent [19]

Ernst et al.

[11] Patent Number: 4,457,395

[45] Date of Patent: Jul. 3, 1984

[54] BEARING ARRANGEMENT FOR THE DRIVING WHEEL OF A VEHICLE

[75] Inventors: Horst M. Ernst, Eltingshausen; Manfred Brandenstein, Eussenheim; Lothar Walter, Schweinfurt, all of Fed. Rep. of Germany

[73] Assignee: SKF Kugellagerfabriken GmbH, Schweinfurt, Fed. Rep. of Germany

[21] Appl. No.: 393,731

[22] Filed: Jun. 30, 1982

[30] Foreign Application Priority Data

Jul. 3, 1981 [DE] Fed. Rep. of Germany ....... 3126192

[51] Int. Cl.³ ............................................. B60K 17/30
[52] U.S. Cl. ................................ 180/254; 308/DIG. 8
[58] Field of Search ........................ 180/254, 258, 259; 308/DIG. 7, DIG. 8

[56] References Cited

U.S. PATENT DOCUMENTS

| 3,008,776 | 11/1961 | Love et al. | 308/DIG. 7 |
| 3,295,626 | 1/1967 | Cadiou | 180/259 |
| 3,583,511 | 6/1971 | Asberg | 180/259 |
| 3,936,099 | 2/1976 | Braun et al. | 308/DIG. 8 |
| 4,240,680 | 12/1980 | Kryde et al. | 180/259 |

FOREIGN PATENT DOCUMENTS 2105123 9/1971 Fed. Rep. of Germany ...... 180/259

Primary Examiner—Joseph F. Peters, Jr.
Assistant Examiner—Kenneth R. Rice
Attorney, Agent, or Firm—Daniel M. Rosen

[57] ABSTRACT

A bearing arrangement for a driving wheel of a vehicle consisting of a rolling bearing and a shaft coupling, wherein the bearing rings of the rolling bearing have a flange for fastening the bearing arrangement to the vehicle frame and a flange for holding the wheel.

In order to provide an economical construction and a simple assembly of the wheel bearing arrangement, which also has good shock absorbing characteristics, the driven part of the shaft coupling is preferably of a fiber-strengthened plastic material and is interconnected with an interference fit with the inner ring of the rolling bearing.

15 Claims, 3 Drawing Figures

BEARING ARRANGEMENT FOR THE DRIVING WHEEL OF A VEHICLE

This invention relates to a bearing arrangement for the driving wheel of a vehicle, consisting of a rolling bearing, whose bearing rings have, respectively, a flange for affixing the bearing arrangement to the vehicle frame, and a flange for affixing the bearing arrangement to a wheel, the bearing also having a shaft coupling.

DE-OS No. 2,105,123 discloses a wheel bearing arrangement of the above type, in which a separate part serving as a drive part for the parallel link is inserted in the bore of the bearing inner ring, and is welded thereto. This known arrangement has the disadvantage that the welding of the two parts requires additional work in fabricating the device, and that the parallel link arrangement cannot be replaced.

DE-OS No. 1,915,932 describes a further bearing arrangement for the drive of a motor vehicle, in which a flanged inner ring half of the rolling bearing is arranged on a threaded shoulder coupled to the other inner ring half, the other inner ring half being coupled to the outer ring of the parallel link arrangement. The inner ring half of the rolling bearing is formed as a single piece with the drive part of the parallel link arrangement and has a relatively complicated forged component. In addition, the production of the screw connection requires extra work in fabricating the device.

It is, therefore, the object of this invention to provide improvements in wheel bearing arrangements of the above type, wherein the production and assembly of the arrangements are simplified, and the resultant wheel bearing arrangement has good shock absorbing characteristics.

This object is solved by providing a wheel bearing arrangement in which the driven part of the shaft coupling is preferably of a plastic material strengthened with fibers, and interconnected with an interference fit with the inner ring of the wheel bearing.

Due to the use of the preferably fiber reinforced plastic material for the hollow spherical driven part of the parallel link, this part can be easily produced by molding or casting, and has a high stability as a result of the use of the embedded fibers or the like. If a plastic material reinforced with carbon fibers or the like is employed, the parallel link arrangement requires substantially no additional lubrication. As a result of the use of a plastic material instead of steel, the weight of the bearing arrangement in accordance with the invention is reduced, as compared with known bearing arrangements.

According to a further feature of the invention the projections and recesses form a prestressed toothing or gearing, such that high torque can be transmitted from the driving part to the driven part.

According to a further feature of the invention the inner ring of the rolling bearing is provided with an extension of the side thereof towards the wheel, and inner and/or outer radially directed encircling projections are provided on the free end of this extension. In this feature of the invention the hollow spherical driven part of the parallel link and the flange for holding the wheel to the inner ring can be injection molded or cast on the inner ring of the rolling body, thereby resulting in an inexpensive technique for producing the wheel bearing arrangement.

In order that the invention will be more clearly understood, it will now be disclosed in greater detail with reference to the accompanying drawings, wherein.

Figure 1:
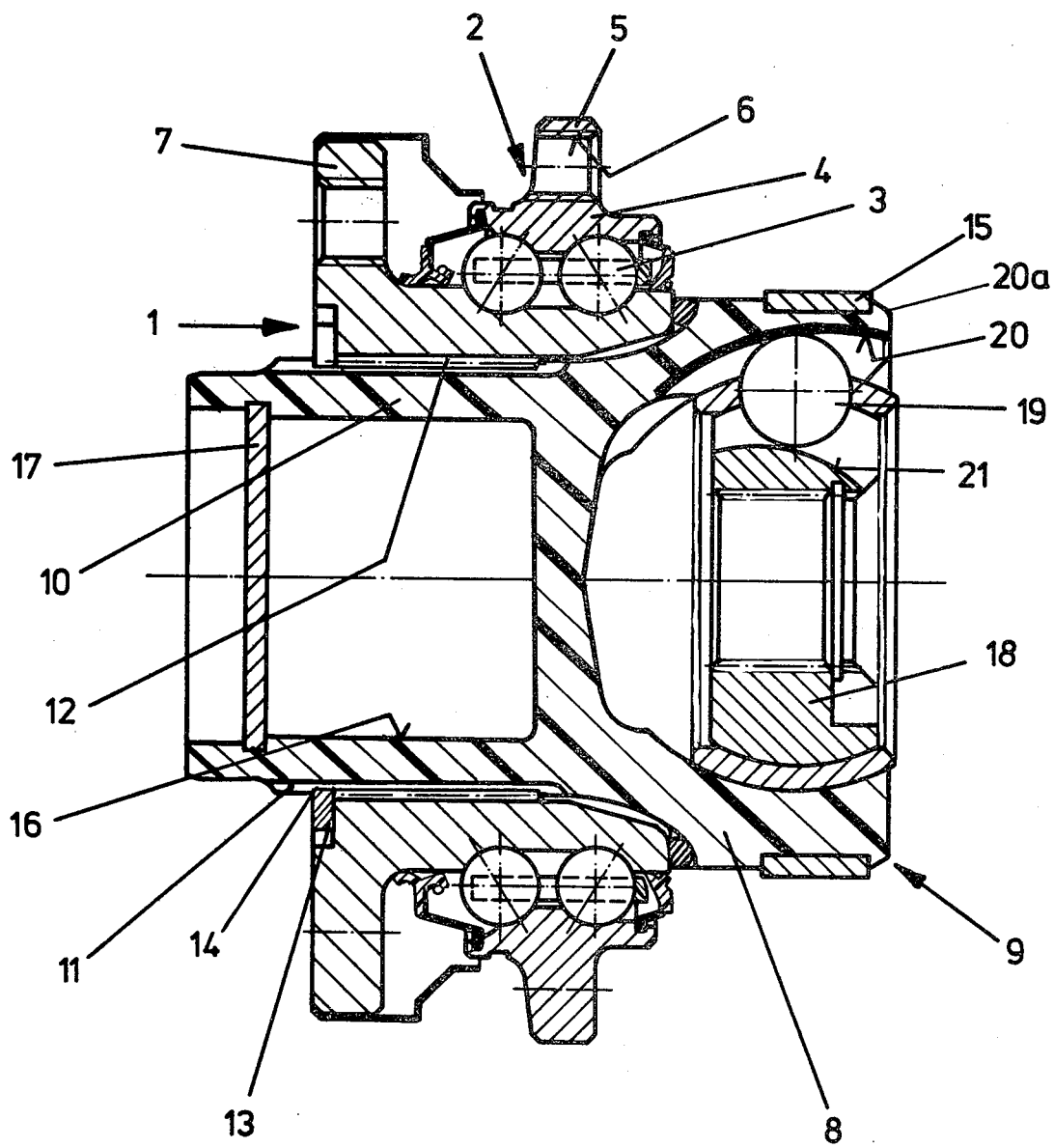
FIG. 1 is a cross-sectional view of a wheel bearing arrangement according to the invention having a parallel link in the bore of the inner ring of the rolling bearing.

In the arrangement of the invention illustrated in FIG. 1, the inner ring 1 of the rolling bearing 2 is arranged to be rotatable in the outer ring 4 by means of two rows of rolling bodies 3. The outer ring is provided with a flange 5 having at least one axially directed threaded hole 6, so that the bearing arrangement may be fixedly mounted to a vehicle (not shown) by means of suitable bolts (not shown) threaded into the hole or holes 6. The flange 7 on the inner ring 1 serves to affix the bearing arrangement to a wheel (not shown). The hollow spherically shaped driven part 8 of the parallel linkage 9 is provided with an extension 10 on the side thereof toward the wheel, this extension 10 having externally axially extending grooves with projections 11, the projections 11 intermeshing with projections in the recesses 12 of the inner bore of the inner ring, so that the rolling bearing 2 is connected to the parallel link 9 to form an integral unit and an interference fit is provided for transmitting torque between the driving part and the driven part. The axial holding of the rolling bearing 2 on the extension 10 of the hollow spherical driving part 8 is provided by a spring ring 13 snapped into a groove 14 of the extension 10. The hollow spherical driven part 8 is made from a plastic material strengthened by carbon fibers or the like and is provided with a steel ring 15. In order to minimize the weight, the extension 10 of the hollow spherical driving part 8 is provided with a central recess 16 closed at its open end with a cover 17. The bore 16 can serve as a lubricating material reservoir for lubrication of the rolling bearing 2 and the parallel link 9 in combination with suitable feed holes (not shown). Balls 19 are provided between the driven part 8 and the driving part 18 of the parallel link 9, the balls 19 being arranged in a pair of cooperating grooves 20, 21 in the driven part 8 and driving part 18, respectively, of the parallel link 9, the grooves 20 being formed with sheet metal inserts 20a which are embedded in the plastic material. The driving of the wheel extends by way of the parallel link 9 that is connected to a drive shaft (not shown) of the vehicle. The bearing arrangement has excellent damping characteristics, since it is damped from shock arising at the wheel by means of the plastic driven part 8. Due to the use of a plastic material strengthened by carbon fibers or the like, a high tensile strength and a dry lubrication of the parallel link is attained. A defective parallel link can be easily removed and replaced by a new one.

Figure 2:
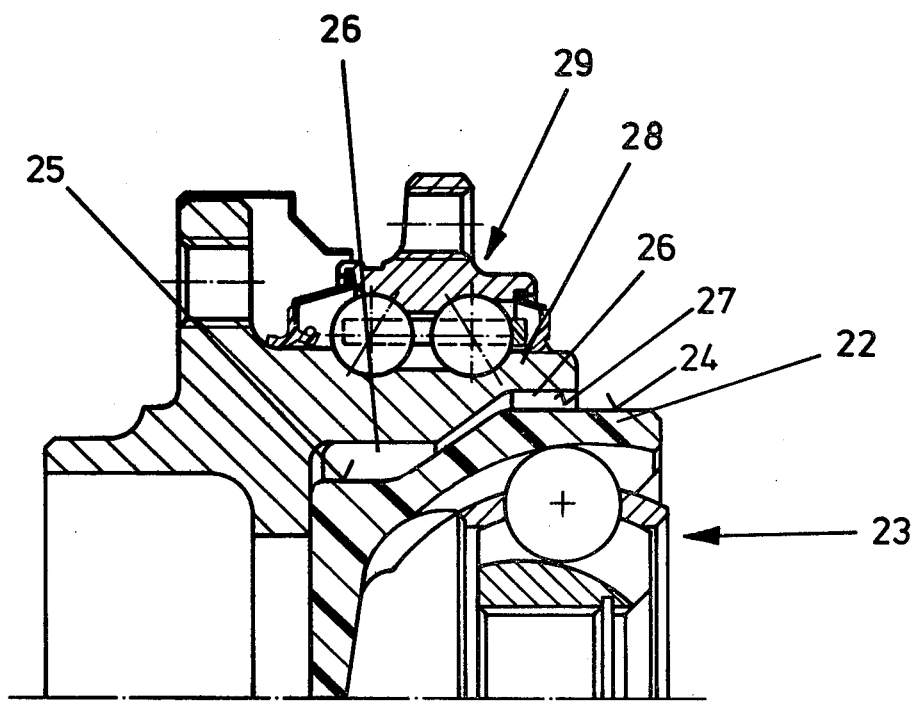
FIG. 2 is a cross-sectional view of a portion of another embodiment of a wheel bearing arrangement according to the invention.

The wheel bearing arrangement illustrated in FIG. 2 differs from the arrangement of FIG. 1 essentially in the formation and arrangement of the driven part 22 of the drive coupling 23. This driven part 22 is likewise of a carbon fiber or the like strengthened plastic material, and is cup-shaped. The radially outer surface of the driven part 22 has two sections 24, 25 with different diameters, each of these parts 24, 25 being provided with outer toothed projections 26. These projections 26 intermesh with projections in the corresponding recesses 27 of the inner toothed portion of the bore of the inner ring 28. In this embodiment of the invention the section which forms the driven part 22 of the drive coupling extends axially in the region of the race of the rolling bearing 29, so that the axial extent of the bearing arrangement can be held to be very small, thereby resulting in an increased stiffness of the wheel bearing arrangement.

Figure 3:
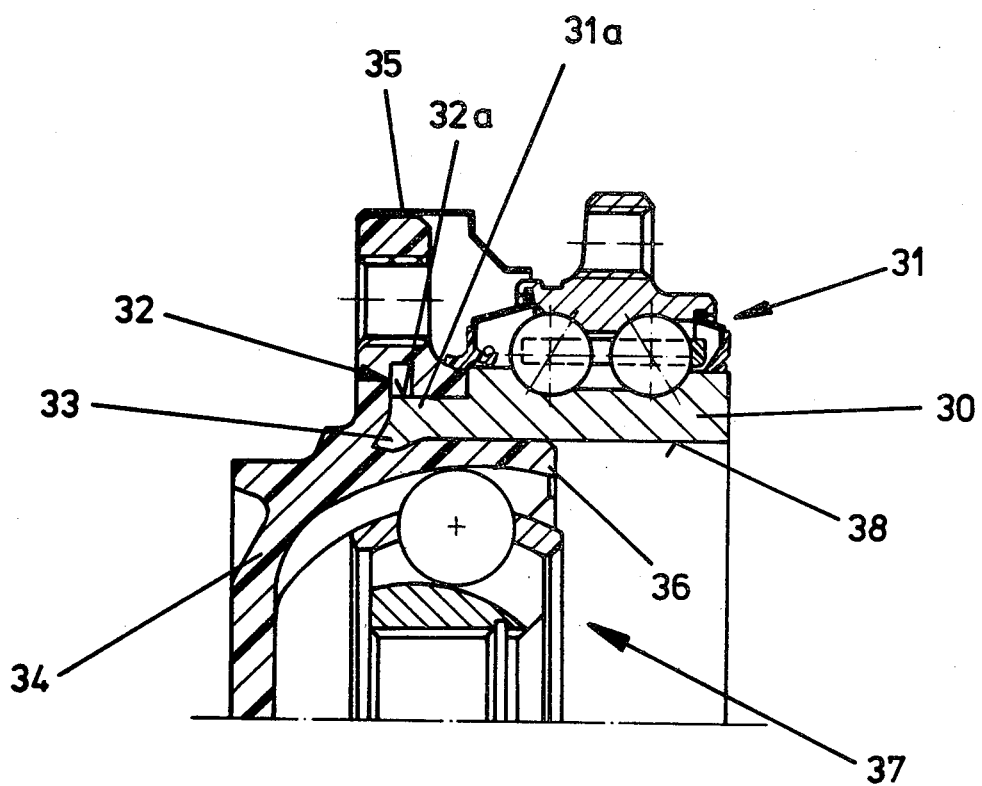
FIG. 3 is a cross-sectional view of a portion of a still further embodiment of the wheel bearing arrangement in accordance with the invention.

In the embodiment of a wheel bearing arrangement illustrated in FIG. 3, the inner ring 30 of the rolling bearing 31 is provided with an extension 31a on the side directed toward the wheel, and with radially outwardly and/or inwardly directed encircling projections 32, 33 having recesses 32a. The hollow spherical driven part 34, as well as a radially outwardly directed flange 35 for holding the wheel (not shown) are directly injection molded on this extension 31a. The radially outwardly directed rim 32 of the inner ring 30 can extend over the entire height of the flange 35, so that a greater stiffness may be obtained. The section 36 of the driven part 34 of the drive coupling 37, whose inner surface forms a part of the race, is supported radially by the inner ring 30.

The above-described arrangements constitute only examples of the wheel bearing arrangement in accordance with the invention. Variations in the construction of the individual components are, of course, possible within the scope of the invention. For example, sliding elements may be employed in the drive coupling 9 instead of the balls 19. Further, a different type of shaft coupling may be employed than the above-described parallel link. Still further, the plastic for the driven part of the shaft coupling may be strengthened not only with fibers, but also with other materials.

It is therefore intended to cover each such variation and modification that falls within the true spirit and scope of the invention in the following claims.

What is claimed is:

1. In a bearing arrangement for the driving wheel of a vehicle, consisting of a rolling bearing having an inner and an outer ring, said outer ring being provided with a flange for affixing the bearing arrangement to a vehicle frame and said inner ring having a bore, and further including a shaft coupling having a drive part and a driven part, the improvement wherein said driven part of said shaft coupling is of a fiber strengthened plastic material and is connected to said inner ring of the wheel bearing with an interference fit, and said inner ring of said rolling bearing and said driven part of the shaft coupling have intermeshing projections and recesses providing said interference fit connection of the two parts in the circumferential direction.

2. The bearing arrangement of claim 1 wherein said inner ring of said rolling bearing is provided with a flange to which a wheel is affixed.

3. The bearing arrangement of claim 1, wherein the projections and the recesses have prestressed toothing.

4. The bearing arrangement of claim 3, wherein said driven part has an axial extension and said toothing is arranged on the outer surface of said axial extension of said driven part and in the bore of said inner ring.

5. The bearing arrangement of claim 4, wherein the extension is provided with an axial recess.

6. The bearing arrangement according to claim 3, wherein the driven part of the shaft coupling is cup-shaped and has two sections of its outer surface with different diameters, said two sections having outer toothing with projections, said projections meshing in corresponding recesses of inner toothing in the bore of the inner ring.

7. The bearing arrangement of claim 1, wherein said driven part has an extension and said inner ring of said rolling bearing has an axial extension on the side toward the wheel, said projections and recesses extending radially from said extensions.

8. The bearing arrangement of claim 7, wherein the radially directed projections are provided with several recesses distributed about the circumference of said extension.

9. The bearing arrangement of claim 7, wherein the driven part of the shaft coupling has a radially outwardly directed flange to which the wheel is affixed.

10. The bearing arrangement according to claim 9, wherein the projections extend radially outwardly of the height of said axial extension of said inner ring.

11. The bearing arrangement according to claim 10, wherein a section of the driven part is provided with race grooves and abuts the bore surface of the inner ring.

12. The bearing arrangement of claim 1, wherein the driven part of the shaft coupling has a steel ring for reinforcement.

13. The bearing arrangement of claim 1, wherein the driven part of the shaft coupling is of a plastic material strengthened with carbon fibers.

14. The bearing arrangement of claim 1, wherein the shaft coupling is in the form of a parallel link having balls arranged between the drive part and the driven part for transmitting torque therebetween.

15. The bearing arrangement of claim 1 wherein said driven part of said shaft coupling has a sheet metal insert for reinforcement.

* * * * *